United States Patent [19]

Lee

[11] Patent Number: 6,077,184

[45] Date of Patent: Jun. 20, 2000

[54] SHAFT ASSEMBLY FOR USE IN A WASHING MACHINE

[75] Inventor: Hyeong-reol Lee, Suwon, Rep. of Korea

[73] Assignee: Samsung Electronics Co., Ltd., Suwon, Rep. of Korea

[21] Appl. No.: 09/078,278

[22] Filed: May 14, 1998

[30] Foreign Application Priority Data

Oct. 9, 1997 [KR] Rep. of Korea ............... 97-51809
Oct. 9, 1997 [KR] Rep. of Korea ............... 97-51810

[51] Int. Cl.[7] .................................................. F16H 57/08
[52] U.S. Cl. ........................ 475/331; 475/345; 475/902; 68/23.7
[58] Field of Search ........................... 475/331, 345, 475/902, 346; 68/23.7

[56] References Cited

U.S. PATENT DOCUMENTS

| | | | |
|---|---|---|---|
| 1,912,801 | 6/1933 | Stephenson | 475/346 X |
| 3,421,390 | 1/1969 | Lohr | 475/331 X |
| 4,901,602 | 2/1990 | Matoba | 475/331 X |
| 5,098,358 | 3/1992 | Igaku | 475/345 X |
| 5,139,468 | 8/1992 | Churchill et al. | 475/324 |
| 5,187,954 | 2/1993 | Kim et al. | 68/23.7 X |
| 5,853,346 | 12/1998 | Gaffney | 475/346 |

FOREIGN PATENT DOCUMENTS

187 746  7/1992  Taiwan .
250 508  7/1995  Taiwan .

Primary Examiner—Sherry L. Estremsky
Attorney, Agent, or Firm—Burns, Doane, Swecker & Mathis, L.L.P.

[57] ABSTRACT

A shaft assembly used in a washing machine, which can prevent noise generated from a gear assembly therein. The shaft assembly has a speed reduction gear assembly including an internal gear, a sun gear, and planet gears. The sun gear is a helical gear made of plastic. An input shaft of the shaft assembly is inserted into the sun gear. Relative movement between the sun gear and the planet gears is prevented by a cover member. Since the sun gear is a helical gear made of plastic, noise is reduced. Furthermore, the movement of the gears caused by the thrust of the helical gear is prevented by the cover member, and therefore the noise is still more reduced.

4 Claims, 7 Drawing Sheets

SHAFT ASSEMBLY FOR USE IN A WASHING MACHINE

BACKGROUND OF THE INVENTION

1. Field of the Invention

The present invention relates to a shaft assembly for use in a washing machine, and more particularly, to a shaft assembly which can prevent noise generated from a speed reduction gear assembly therein.

2. Prior Art

Figure 1:
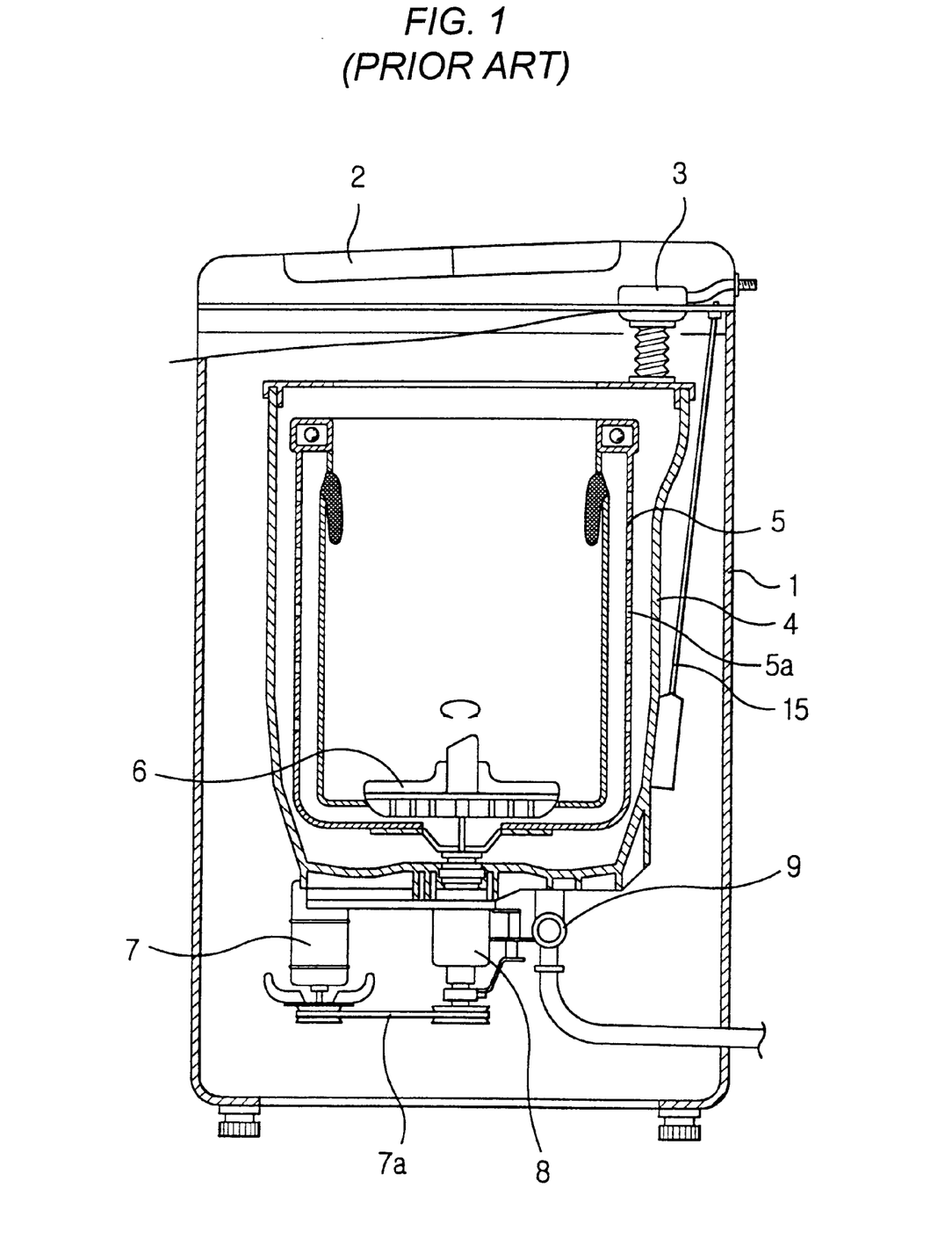
FIG. 1 is a side sectional view of a general washing machine.

A general automatic washing machine has, as shown in FIG. 1, a washing tub 4 supported by a plurality of suspensions 15 in an outer casing 1, a dehydration tub 5 accommodated in the washing tub 4, a pulsator 6 installed at the bottom of the dehydration tub 5, a motor 7 for driving the pulsator 6, and a shaft assembly 8 for transmitting a driving force of the motor 7 to the pulsator 6 and the dehydration tub 5.

A top cover 2 covers the upper part of the outer casing 1, and a water supply device 3 for supplying the washing tub 4 and the dehydration tub 5 with washing water is installed at the upper part of the washing tub 4. At the lower side of the washing tub 4 is installed a drain device 9 for draining the water in the washing tub 4 and the dehydration tub 5 after a washing operation.

When the washing machine begins to operate, the washing water is supplied to the washing tub 4 and the dehydration tub 5 through the water supply device 3, and when the water supplying operation is completed, the motor 7 begins to operate. The torque of the motor 7 is transmitted to the shaft assembly 8 through a belt 7a, and then the shaft assembly 8 rotates the pulsator 6. The rotation of the pulsator 6 causes the vortex water flow in the dehydration tub 5, and laundry accommodated in the dehydration tub 5 is washed by the vortex water flow.

When the washing operation is completed, the washing water in the dehydration tub 5 is drained outside through drain ports 5a formed at the side of the dehydration tub 5 and the drain device 9. When the draining operation is completed, a dehydration operation begins.

In the dehydration operation, the motor 7 drives at a high speed, and the shaft assembly 8 transmits the torque of the motor 7 to the pulsator 6 and the dehydration tub 5 simultaneously. Then the dehydration tub 5 and the pulsator 6 are rotated altogether at a high speed, and thereby the laundry is dehydrated by a centrifugal force.

Figure 2:
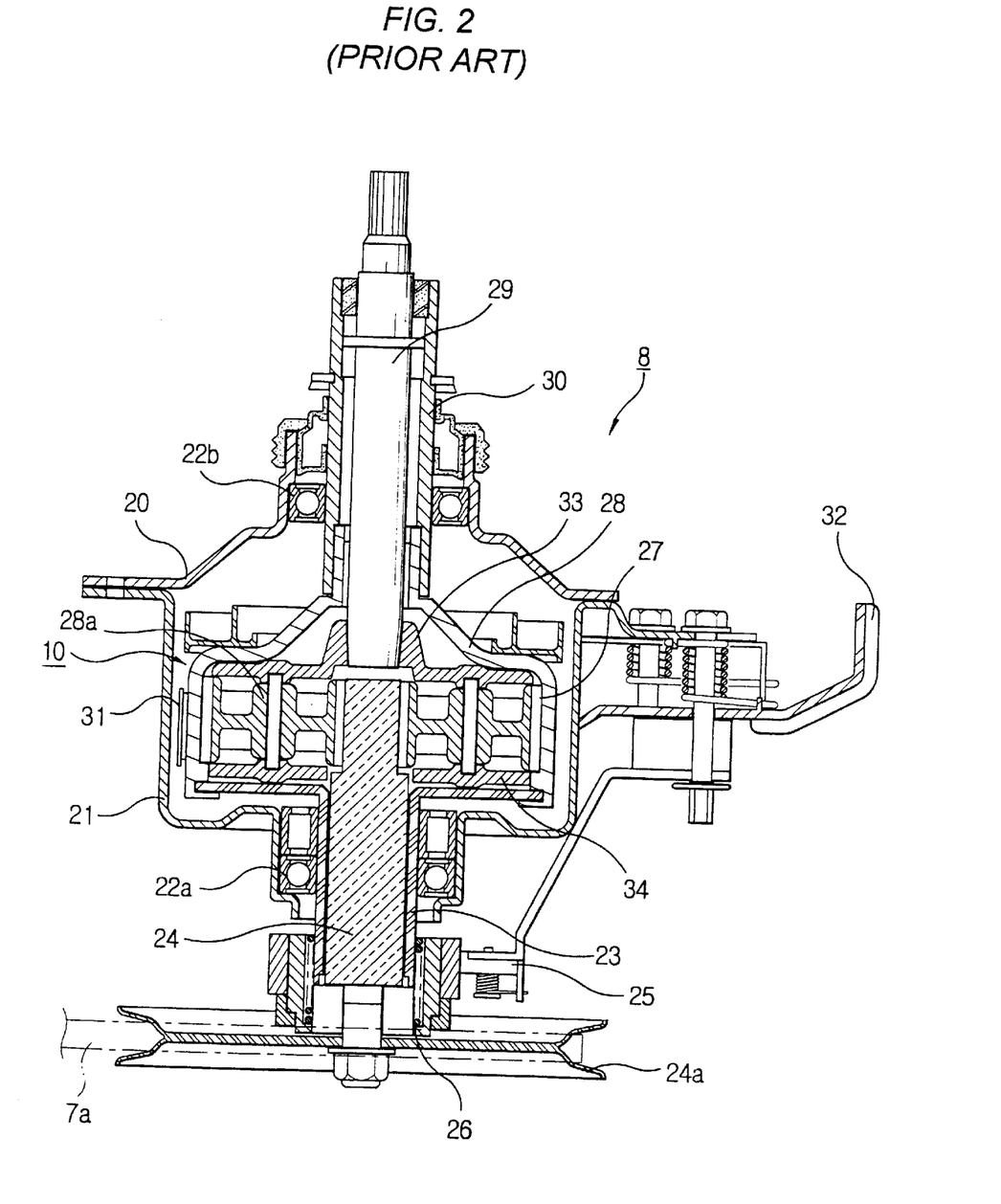
FIG. 2 is an enlarged side sectional view of the shaft assembly shown in FIG. 1.
Figure 3:
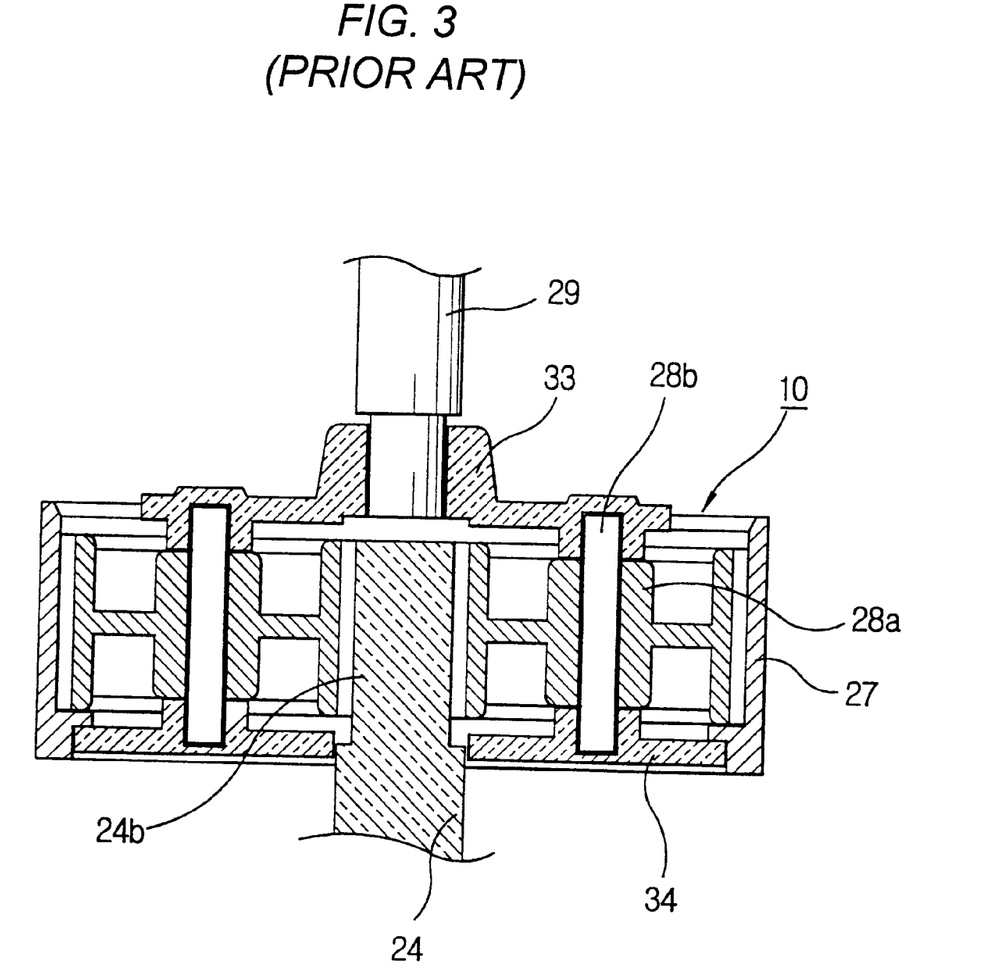
FIG. 3 is an enlarged side sectional view of the speed reduction gear assembly shown in FIG. 2.

FIG. 2 is an enlarged side sectional view of the shaft assembly 8, and FIG. 3 is a partial enlarged view of FIG. 2. The shaft assembly 8 has an input shaft 24 and an output shaft 29 which are inserted respectively at a lower housing 21 and an upper housing 20, a speed reduction gear assembly 10 disposed between the input shaft 24 and the output shaft 29, a hollow shaft 23 installed outside the input shaft 24 to be coaxial with the input shaft 24, a dehydration shaft 30 installed outside the output shaft 29 to be coaxial with the output shaft 29, bearings 22a and 22b supporting the hollow shaft 23 and the dehydration shaft 30 to be capable of rotating, and a clutch lever 32 for selecting the washing operation and dehydration operation.

A shaft pulley 24a is installed at the input shaft 24, and the shaft pulley 24a is connected with the motor 7 through a belt 7a. The input shaft 24 and the hollow shaft 23 are connected with each other by a clutch spring 26. The clutching operation of the clutch spring 26 is controlled by a clutch sleeve 25 which is operated by the clutch lever 32.

The speed reduction gear assembly 10 is comprised of a break drum 28, an internal gear 27 being fixed at the break drum 28, a sun gear 24b being disposed coaxially with the internal gear 27 and being formed at the upper end part of the input shaft 24 in a body with the input shaft 24, and a plurality of planet gears 28a being installed around the sun gear 24b and being engaged with the internal gear 27 and the sun gear 24b. The shafts 28b of respective planet gears 28a are rotatably supported by an upper carrier 33 and a lower carrier 34, and the upper carrier 33 is fixedly connected to the output shaft 29 and rotates together with the output shaft 29. The output shaft 29 is connected to the pulsator 6.

While the break drum 28 is fixed by an external force, when the input shaft 24 rotates, the planet gears 28a are rotated by the sun gear 24b. The output shaft 29 is rotated by the rotation of the planet gears 28a. In this situation, since the planet gears 28a are rotated at a lower speed than the rotational speed of the sun gear 24b, the output shaft 29 is rotated at a lower speed than the rotational speed of the input shaft 24, and thereby the rotation of the input shaft 24 is transmitted to the output shaft 29 in a speed reducing manner. Therefore, the pulsator 6 rotates at a low speed when the motor 7 rotates.

The break drum 28 is connected with the hollow shaft 23 at the lower side thereof and with the dehydration shaft 30 at the upper side thereof. Therefore, the hollow shaft 23, the break drum 28 and the dehydration shaft 30 will rotate altogether. The dehydration shaft 30 is connected to the dehydration tub 5.

While the input shaft 24 and the hollow shaft 23 are fixed with each other along the rotational direction thereof by the clutch spring 26, if the shaft pulley 24a is rotated, the break drum 28 is rotated by the shaft pulley 24a, and the dehydration shaft 30 is rotated by the break drum 28. Thus, the dehydration tub 5 is rotated at a high speed, and the laundry accommodated in the dehydration tub 5 is dehydrated.

The clutch lever 32 is driven by a drain motor which is not shown in the figure. The clutch lever 32 controls a break band 31 disposed at a side of the break drum 28 and the clutch sleeve 25, simultaneously.

In the washing operation, the clutch lever 32 drives the break band 31 to break the break drum 28, and drives the clutch sleeve 25 to release the clutch spring 26. Accordingly, the torque of the shaft pulley 24a is transmitted to the pulsator 6 through the input shaft 24, the speed reduction gear assembly 10, and the output shaft 29, and then the pulsator 6 rotates at a low speed.

In the dehydration operation, the clutch lever 32 drives the break band 31 to release the break drum 28, and drives the clutch sleeve 25 to perform the clutching operation of the clutch spring 26. Then, the shaft pulley 24a rotates the input shaft 24 together with the hollow shaft 23, and then the break drum 28 and the dehydration shaft 30 are rotated together with the hollow shaft 23. Accordingly, the dehydration tub 5 connected with the dehydration shaft 30 is rotated at a high speed.

In such a shaft assembly 8 for use in a washing machine, there is a problem that noise is generated from the speed reduction gear assembly 10 during the washing and dehydrating operations. That is, since the speed reduction gear assembly 10 is comprised of a plurality of gears 24b, 27, and 28a, the noise is generated due the tolerance of the gears 24b, 27, and 28a when the input shaft 24 rotates.

In order to reduce such a noise, a shaft assembly has been proposed in which the gears 24b, 27, and 28a in the speed reduction gear assembly 10 are helical gears. However, since the sun gear 24b is formed in a body with the input shaft 24, it is so hard to form the sun gear 24b into a helical gear.

Furthermore, if the gears 24b, 27, and 28a are comprised of the helical gears, there is a problem that noise caused by a thrust between the gears 24b, 27, and 28a occurs when the input shaft 24 rotates. That is, when the input shaft 24 rotates, the sun gear 24b or the planet gears 28a are moved up and down by the thrust of the helical gears, so the sun gear 24 may strike against the output shaft 29, or the planet gears 28a may strike against the upper carrier 33 or lower carrier 34. Thus the speed reduction gear assembly 10 generates noise during the operation of the washing machine.

SUMMARY OF THE INVENTION

The present invention has been proposed to overcome the above described problems in the prior art, and accordingly it is an object of the present invention to provide a shaft assembly used in a washing machine, which can prevent noise of the speed reduction gear assembly.

To achieve the above object, the present invention provides a shaft assembly having an input shaft being rotated by a motor and an output shaft being connected to a pulsator, the shaft assembly comprising: a speed reduction gear assembly including an internal gear, a sun gear being assembled with the input shaft by insertion so as to be relatively fixed along a rotational direction thereof, the sun gear being made of plastic, and a plurality of planet gears engaged with the internal gear and the sun gear; an upper carrier for supporting respective ends of rotational shafts of the planet gears, the upper carrier fixedly assembled with the output shaft; and a lower carrier for supporting respective the other ends of rotational shafts of the planet gears.

Here, the internal gear, the sun gear, and the planet gears are helical gears. Thus, the noise is still more reduced.

Preferably, the shaft assembly has a means for preventing relative movement of the sun gear and the planet gears to each other along an axial direction thereof. The relative movement preventing means comprises cover members disposed between the upper carrier and the speed reduction gear assembly and between the lower carrier and the speed reduction gear assembly respectively, the cover members for relatively fixing the sun gear and the planet gears to each other along the axial direction.

Furthermore, the shaft assembly has a means for preventing movement of the sun gear toward the output shaft. The movement preventing means comprises a support shaft disposed between the sun gear and the output shaft coaxially therewith, the support shaft of which both ends are inserted into the sun gear and the output shaft respectively.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Hereinafter, the present invention will be described in detail with reference to the drawings. The same parts with the parts of the conventional shaft assembly shown in FIGS. 1 through 3 will not be described and are referred to with the same reference numerals.

Figure 4:
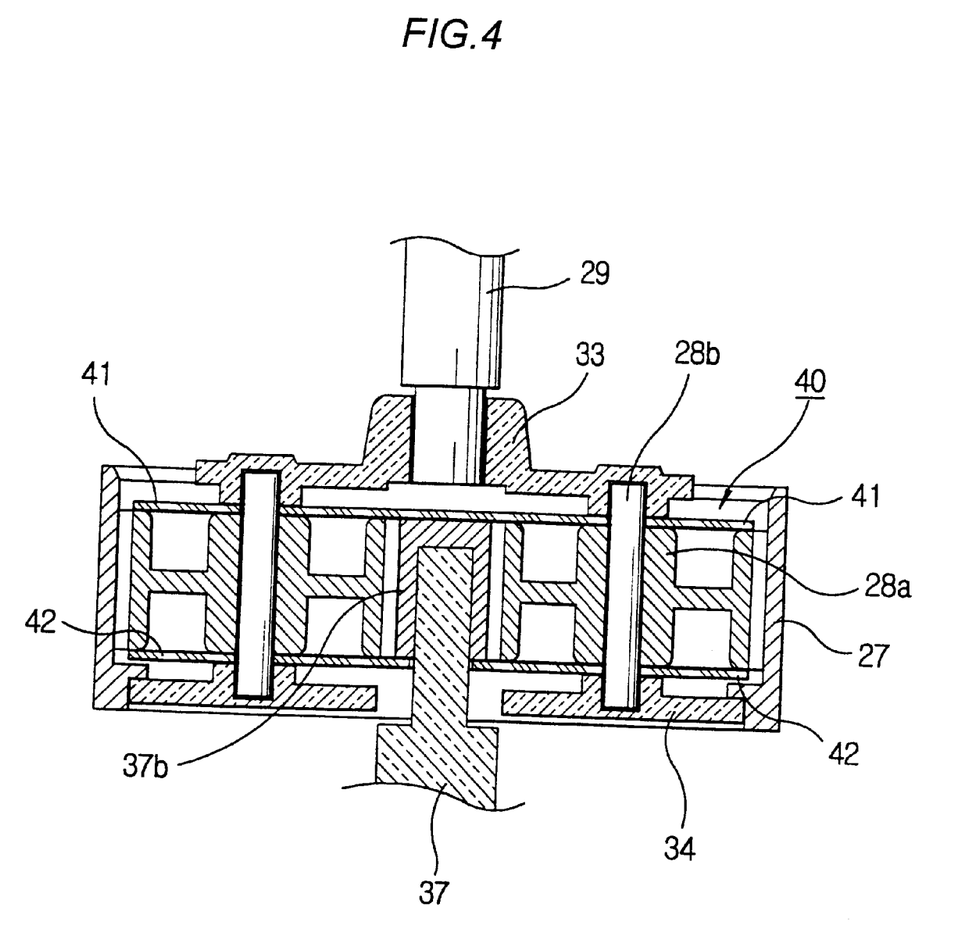
FIG. 4 is a side sectional view of a speed reduction gear assembly according to the present invention.

FIG. 4 is a side sectional view of the speed reduction gear assembly according to an embodiment of the present invention.

The speed reduction gear assembly 40 has an internal gear 27, a sun gear 37b and a plurality of planet gears 28a. Also, the speed reduction gear assembly 40 has an upper carrier 33 for connecting ends of the shafts 28b of the respective planet gears 28a to the output shaft 29, and a lower carrier 34 for supporting the other ends of the shafts 28b of the respective planet gears 28a.

The sun gear 37b and the input shaft 37 are separately manufactured and then assembled with each other. The sun gear 37b is made of plastic, and preferably made of plastic having a high rigidity sufficient to endure the driving force of the input shaft 37. The internal gear 27, the sun gear 37b and the planet gears 28a are helical gears.

Figure 5:
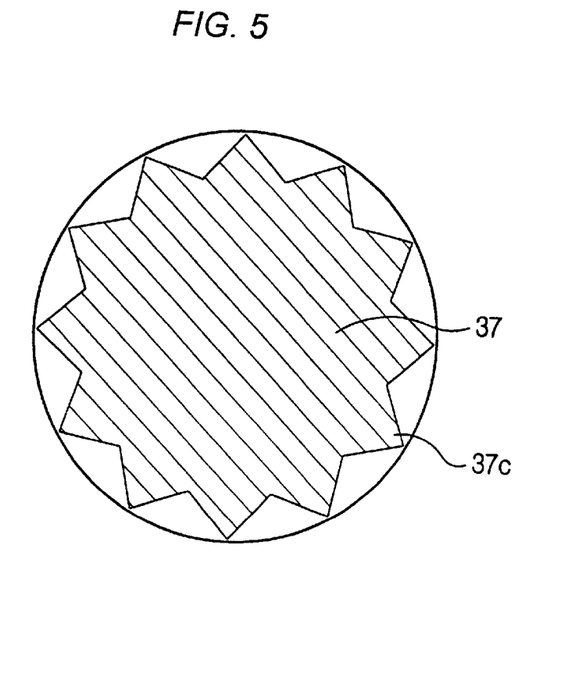
FIG. 5 is an enlarged transverse sectional view of a first embodiment of the input shaft shown in FIG. 4.
Figure 6:
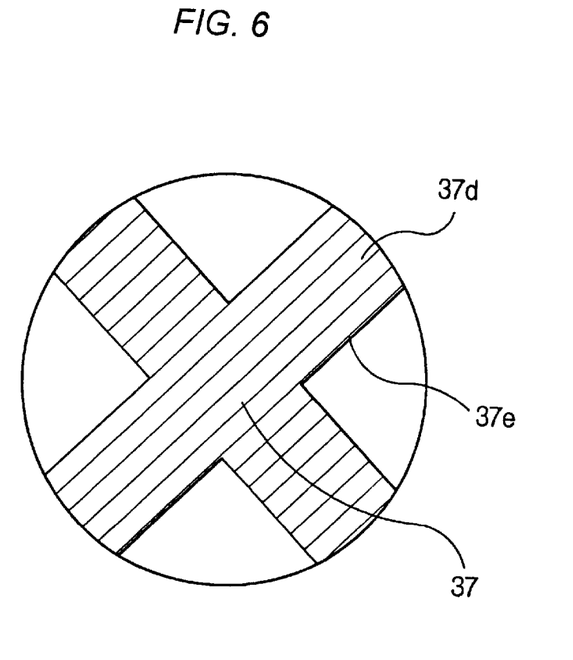
FIG. 6 is an enlarged transverse sectional view showing a second embodiment of the input shaft shown in FIG. 4.
Figure 7:
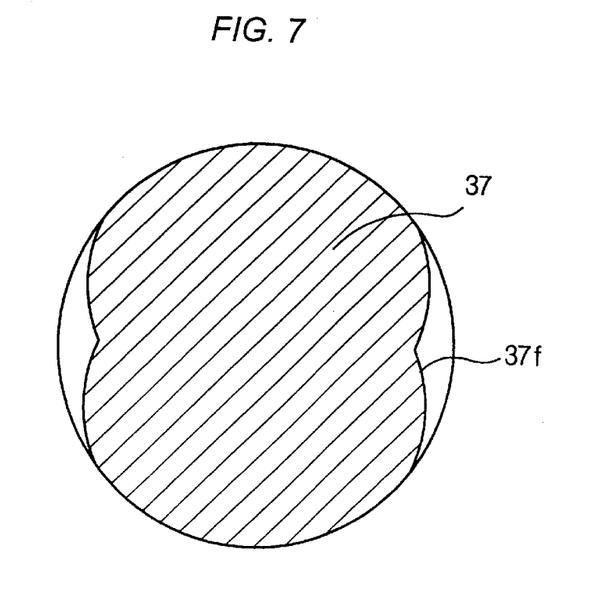
FIG. 7 is an enlarged transverse sectional view showing a third embodiment of the input shaft shown in FIG. 4.

The input shaft 37 and the sun gear 37b are assembled with each other so as to be form-fitted with each other by a profile which is varying in height along a radial direction thereof, whereby they are assembled with each other so as to be relatively fixed in rotational direction thereof. The examples of the input shaft 37 for such an assembly between the sun gear 37b and the input shaft 37 are shown in FIG. 5 through FIG. 7. FIGS. 5 through 7 show the examples of the shape of the upper part of the input shaft 37 inserted into the sun gear 37b. FIG. 5 shows the example that a serration 37c is formed at the input shaft 37, FIG. 6 shows the example that protrusions 37d and depressions 37e are formed, and FIG. 7 shows the example that recesses 37f are formed. Only the shapes of the input shaft 37 are shown in the figures, however, the sun gear 37b has the inner shapes which are form-fitted with the outer shapes of the input shaft 37 which are shown in the examples.

An upper cover member 41 is disposed between the upper carrier 33 and the speed reduction gear assembly 40, and a lower cover member 42 is disposed between the lower carrier 34 and the speed reduction gear assembly 40. The cover members 41 and 42 are installed at the upper and lower sides of the planet gears 28a so that the shafts 28b pass therethrough, and the side end part of the cover members 41 and 42 are extended to the edges of the upper and the lower sides of the sun gear 37b. Therefore, the sun gear 37b and the planet gears 28a are relatively fixed with each other along the axial direction thereof, whereby the movement of the sun gear 37b and the planet gears 28a caused by the thrust is prevented. Accordingly, the noise due to the thrust is prevented.

According to the present invention, since the sun gear 37 is made of plastic, the noise generated between the sun gear 37b and the planet gears 28a is reduced when the input shaft 37 rotates. Further, since the gears 27, 28a, and 37b are helical gears, the noise is still more reduced. Moreover, since the up-and-down movement of the sun gear 37b and the planet gears 28a caused by the thrust of the helical gears is prevented by the cover members 41 and 42, the noise due to the thrust is not generated even though the gears 27, 28a, and 37b are comprised of helical gears. Furthermore, since the sun gear 37b and the input shaft 37 are manufactured separately, it is easy to manufacture the sun gear 37b which is the helical gear.

Figure 8:
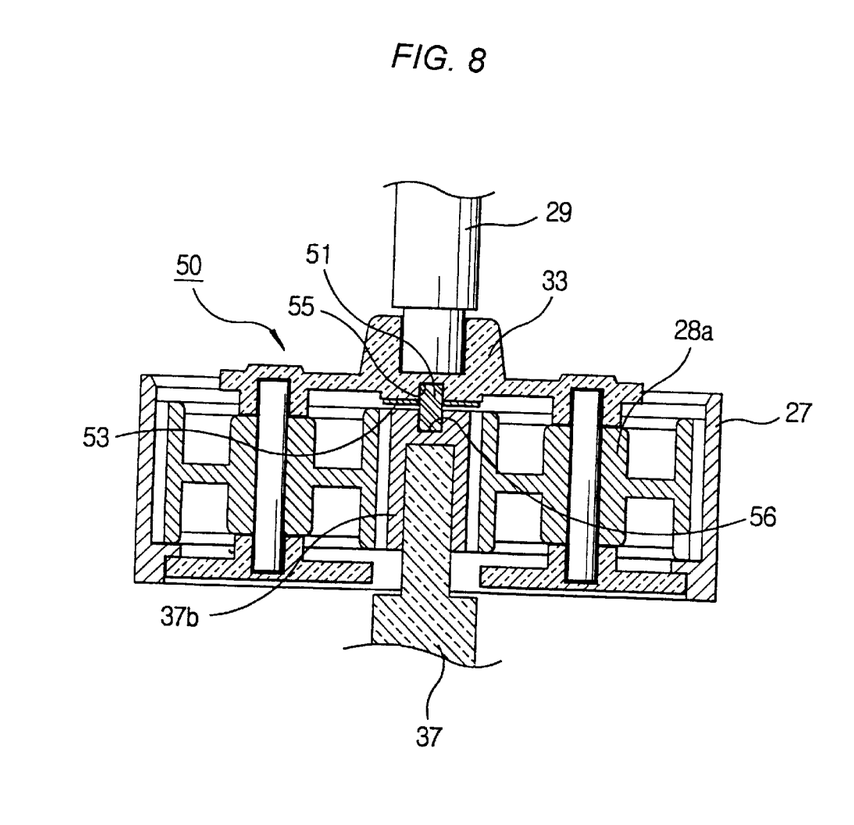
FIG. 8 is a side sectional view of a speed reduction gear assembly according to another embodiment of the present invention.

FIG. 8 is a side sectional view of a speed reduction gear assembly 50 according to another embodiment of the present invention.

In this embodiment, the sun gear 37b is, as the embodiment shown in FIGS. 4 through 7, made of plastic, and the sun gear 37b and the input shaft 37 are assembled with each other by insertion. Also, the gears 27, 28a, and 37b are helical gears.

A support shaft 51 is disposed between the sun gear 37b and the upper carrier 33. At the lower part of the upper carrier 33 and at the upper part of the sun gear 37b are formed recesses 55 and 56 for accommodating the support shaft 51, and the support shaft 51 is inserted into the recesses 55 and 56. The support shaft 51 is coaxially disposed with the upper carrier 33 and the sun gear 37b. A washer 53 is disposed between the sun gear 37b and the upper carrier 33.

The upward movement of the sun gear 37b is prevented by the support shaft 51. Therefore, the strike of the sun gear 37b against the output shaft 29 due to the thrust of the helical gear is prevented, and thereby the noise due to the strike is not generated.

Figure 9:
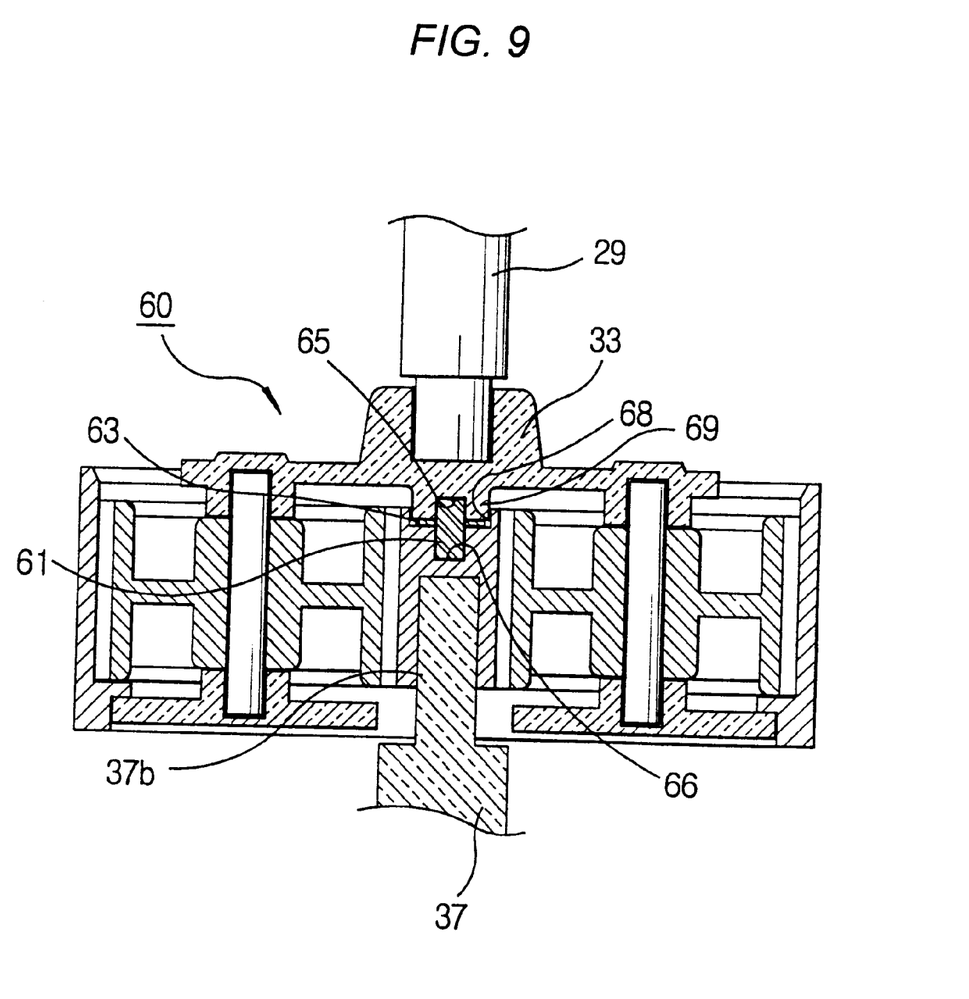
FIG. 9 is another example of the speed reduction gear assembly shown in FIG. 8.

FIG. 9 is another example of the speed reduction gear assembly 60 shown in FIG. 8.

In this example, a protrusion 69 protrudes at the lower part of the upper carrier 33, and an insertion recess 68 into which the protrusion 69 is inserted is formed at the upper part of the sun gear 37b. At the lower part of the protrusion 69 and at the bottom of the insertion recess 68 are formed support recesses 65 and 66 respectively, and the support shaft 61 is inserted into the support recesses 65 and 66. A washer 63 is disposed between the protrusion 69 and the insertion recess 68. In this example, the noise caused by the strike of the sun gear 37b against the output shaft 29 is prevented by the support shaft 61, too.

As described above, according to the present invention, the noise in the speed reduction gear assembly is reduced by the sun gear made of plastic. Furthermore, the noise is still more reduced since the gears are helical gears, and the noise caused by the thrust of the helical gears is prevented by the cover member and the support shaft.

Although the present invention has been described and illustrated in detail, it is clearly understood that the same is by way of illustration and example only and is not to be taken by way of limitation, wherein the spirit and scope of the present invention is limited only by the terms of the appended claims.

What is claimed is:

1. A shaft assembly having an input shaft being rotated by a motor and an output shaft being connected to a pulsator, said shaft assembly comprising:

a speed reduction gear assembly including a helical internal gear, a helical sun gear assembled with said input shaft by insertion so as to be relatively fixed along a rotational direction thereof, said sun gear being made of plastic, and a plurality of helical planet gears engaged with said internal gear and said sun gear;

an upper carrier for supporting respective ends of rotational shafts of said planet gears, said upper carrier fixedly assembled with said output shaft;

a lower carrier for supporting respective other ends of rotational shafts of said planet gears; and means preventing movement of said sun gear toward said output shaft comprising a support shaft disposed between said sun gear and said output shaft coaxially therewith, said support shaft having two ends inserted into said sun gear and said output shaft, respectively.

2. The shaft assembly as claimed in claim 1, wherein said input shaft and said sun gear are assembled with each other so as to be form-fitted with each other by a profile which is varying in height along a radial direction thereof.

3. The shaft assembly as claimed in claim 1, further comprising a means for preventing relative movement of said sun gear and said planet gears to each other along an axial direction thereof.

4. The shaft assembly as claimed in claim 3, wherein said relative movement preventing means comprises cover members disposed between said upper carrier and said speed reduction gear assembly and between said lower carrier and said speed reduction gear assembly respectively, said cover members arranged for relatively fixing said sun gear and said planet gears to each other along the axial direction.

* * * * *